United States Patent
Rockinger et al.

(10) Patent No.: US 6,818,883 B2
(45) Date of Patent: Nov. 16, 2004

(54) METHOD FOR THE INDEPENDENT DETECTION OF HELICOPTER

(75) Inventors: Oliver Rockinger, Friedrichshafen (DE); Juergen A. Topp, Friedrichshafen (DE); Thomas Fechner, Berlin (DE)

(73) Assignee: LFK-Lenkflugkoerpersysteme GmbH, Munich (DE)

( * ) Notice: Subject to any disclaimer, the term of this patent is extended or adjusted under 35 U.S.C. 154(b) by 0 days.

(21) Appl. No.: 10/421,758

(22) Filed: Apr. 24, 2003

(65) Prior Publication Data

US 2004/0022415 A1 Feb. 5, 2004

Related U.S. Application Data

(63) Continuation of application No. 09/759,132, filed on Jan. 16, 2001, now abandoned.

(30) Foreign Application Priority Data

Jan. 14, 2000 (DE) .......................................... 100 01 282

(51) Int. Cl.[7] .................................................. H01J 5/16
(52) U.S. Cl. ...................................................... 250/221
(58) Field of Search .............................. 250/221, 221.1, 250/559.38, 559.4, 342; 382/1, 17, 43, 103–108, 209–212, 48, 10

(56) References Cited

U.S. PATENT DOCUMENTS 5,062,586 A * 11/1991 Hobson et al. ............ 244/3.12

FOREIGN PATENT DOCUMENTS

| DE | 28 47 233 | 5/1980 |
|---|---|---|
| DE | 37 33 681 | 7/1994 |
| DE | 44 23 758 | 1/1996 |
| DE | 195 05 791 | 8/1996 |
| EP | 0564 858 | 10/1993 |
| EP | 0 690 412 | 4/1995 |

OTHER PUBLICATIONS

Mehmet Celenk et al., "Moving Object Tracking In Industrial Work Stations", pp. 289–304, Ohio University, Electrical and Computer Engineering Department, Athens, Ohio.

* cited by examiner

*Primary Examiner*—Tu T. Nguyen
(74) *Attorney, Agent, or Firm*—Crowell & Moring LLP

(57) ABSTRACT

A method for the detection of helicopters from a flying platform utilizes an imaging sensor. Relevant image regions of two successive images are subtracted from one another with respect to picture elements, and within the thus formed differential image, segments are identified by means of a threshold value process. Straight lines of the same orientation are adapted to the identified segments, and intersection points are determined for all such straight lines. Identification of a helicopter is made based on a bunching of the intersection points.

12 Claims, 2 Drawing Sheets

METHOD FOR THE INDEPENDENT DETECTION OF HELICOPTER

This application is a continuation of application Ser. No. 09/759,132, filed Jan. 16, 2000 now abandoned.

BACKGROUND AND SUMMARY OF THE INVENTION

This application claims the priority of German patent document 100 01 282.5, filed 14, Jan. 2000, the disclosure of which is expressly incorporated by reference herein.

The invention relates to a method for the detection of low-flying helicopters from a fast-moving flying platform, such as a targeting and target-tracking missile.

German Patent Document DE 195 05 791 discloses such an arrangement based on a missile system. During a search phase, it searches a given search area for the presence of a target; and, if a target is found, tracks it.

Actual target detection can take place by an analysis of the characteristic radiation of the helicopter, modulated by the rotor blades. This method of detecting helicopters or generally of detecting modulated radiation sources is taught, for example, by German Patent Documents DE 37 33 681 and DE 28 47 233. However, it has the following disadvantages:

By this method alone, no search operation (and therefore no detection) can be implemented from a moving platform, because a potential target object must always be observed for a certain time in order to determine the modulation frequency. A given area cannot be searched in this manner.

The above-mentioned observation time is a function of the sensor, the rotary frequency of the helicopter rotor and the scanning frequency of the sensor. Typical observation times are in the range of from 0.2 to 0.5 sec. During this time, the missile may already have flown so far that the target can no longer be reached by aerodynamic maneuvers.

During the entire observation time, the seeker head must be stabilized precisely onto the potential target. However, in practice, such stabilization cannot be achieved exactly. A large number of faulty detections can therefore be expected because of highly structured image backgrounds and an incompletely stabilized seeker head.

Another method of detecting helicopters is taught in German Patent Document DE 44 23 758 and European Patent Document EP 0 690 412. In this system, an image sensor has two image elements that correspond to the image of the visual field at two successive points in time separated by a brief time interval. These image patterns are supplied to a difference forming device. At points of the background, the brightness values of the two image patterns are similar and cancel one another when the difference is formed. However, the rotor blades of a helicopter have continued to rotate during the corresponding time interval and are maintained during the formation of the difference. In the suggested embodiment, this method has the following disadvantages:

it requires two image sensors which must be precisely positioned with-respect to one another, at a high expense. For economic reasons, an embodiment having only one image sensor is therefore preferable.

Further analysis of the differential image is not described in the above-mentioned documents. In particular, the documents do not show how the position determining of the helicopter takes place within the image field itself and how the disturbance suppression takes place during an unintentional movement of the camera.

The basic idea of the picture-element-type difference formation between two successive images is also described by Celenk and Resa (in: "Moving Object Tracking in Industrial Work Stations", Advances in Instrumentation, Proceedings of the ISA 88 Intl. Conference and Exhibit, Volume 43, Part 1, 1988, Pages 289–304) for tracking moving objects. In this case, the object tracking by using a stationary camera is in the foreground. In that case, the differential image of two directly successive images is used for the object detection (but not for the object classification and recognition of certain object categories) and absolutely requires a stationary camera in the described embodiment.

One object of the invention to provide a method for detecting and identifying helicopters from a fast-flying platform during a time period which is as brief as possible.

This and other objects and advantages are achieved by the detection method according to the invention, which uses imaging sensors (so-called focal plane arrays) that have a high site resolution and sensitivity in the infrared wavelength range. A typical site resolution of a focal plane array is at 256×256 picture elements. On this basis, the detection and identification of a helicopter can advantageously be implemented by means of an image processing method in which the high resolution of the image sensor is utilized.

The special characteristic of a helicopter, which cannot be camouflaged, is its fast-rotating main rotor. The rotor blades heat up due to air friction, and can therefore be detected by an imaging sensor which is sensitive in the range of thermal heat radiation. In addition, a helicopter is characterized by the high radiation intensity of the power units. In the infrared range, a helicopter is therefore clearly distinguished by the fast-rotating main rotor and the hot power unit. It is known to identify movements within an image sequence by calculating the picture-element-type difference between two successive images. The unmoved image portions will then be characterized within the difference image by the zero value; moved image regions can be identified by positive and negative values not equal to zero.

An advantageous approach for detecting a helicopter is to recognize it by its main rotor. However, this detection task becomes difficult because, for the described usage, helicopters are typically situated in proximity to the ground, and behind covers. Thus, a highly structured image background must be assumed, which complicates the analysis of the images, so that a direct analysis of the images cannot be implemented with a satisfactory result.

These problems are solved according to the invention in which two images are analyzed by subtracting them from one another with respect to the picture elements. Since the image background does not move between two successive images, but the main rotor of the helicopter does, the latter can be detected quite easily as segments in the differential image. For this purpose, the differential image computed with respect to picture elements is trinarized (that is, each picture element is classified into one of three levels) using a bipolar threshold value for the positive and negative image fractions. Image segments thus created are selected according to defined validity criteria (advantageously, the minimal segment surface, the maximal segment surface and the minimal eccentricity of a segment). Each segment which satisfies these criteria is then represented by an adapted straight line having the same angular position as the segment itself. By computing the position of intersection points between all such segments, the rotor rotation center can then be determined. If all paired points of intersection are closely adjacent, it can be assumed that the detected object is a helicopter.

Other objects, advantages and novel features of the present invention will become apparent from the following

DETAILED DESCRIPTION OF THE DRAWINGS

Figure 1:
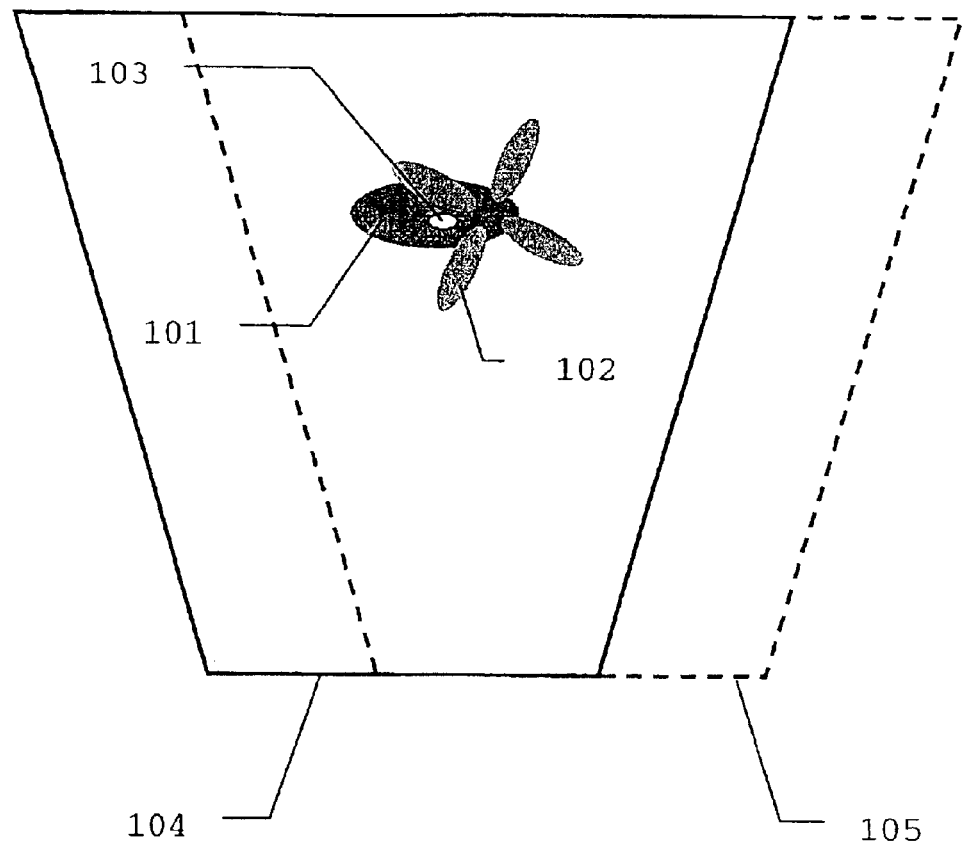
FIG. 1 is a schematic representation of the helicopter to be detected, and the scanning of a search area during the searching operation.

FIG. 1 shows a helicopter 101 during a search operation. The rotor blades 102 heat up as a result of air friction, and therefore become visible by an imaging infrared sensor, together with the hot power unit emissions 103, which are also visible in the infrared image. During the search operation, the relevant search area is scanned by an imaging infrared sensor, with an overlap of at least half a visual field between two directly successive visual fields 104 and 105 projected onto the ground. As a result, it is ensured that each point of the search area is visible in at least two directly successive images and the differential image process can be used.

Figure 2:
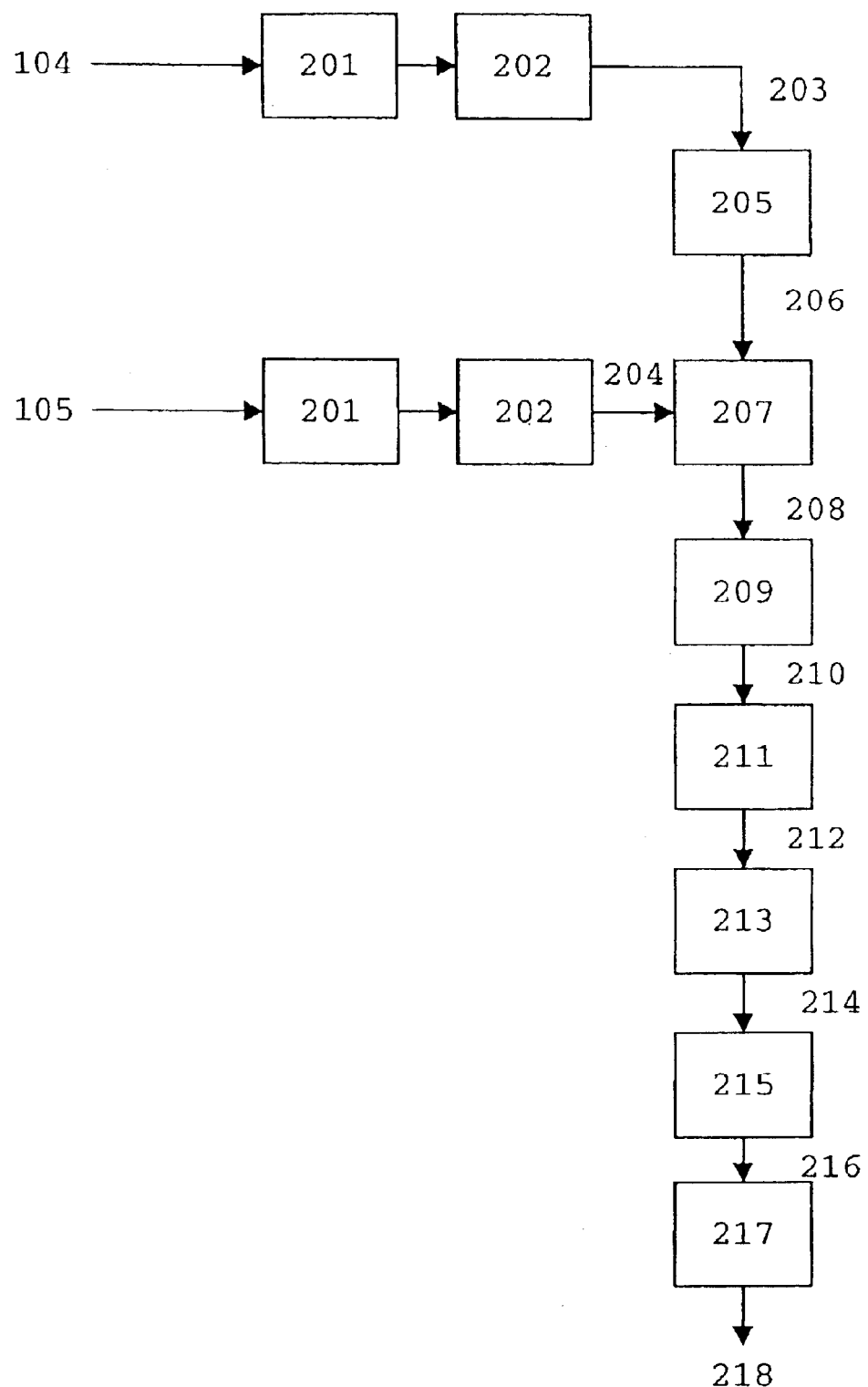
FIG. 2 is a block diagram which illustrates an embodiment of the method of detecting and identifying helicopters according to the invention.

FIG. 2 is a block diagram which shows the details of the detection and identification process. The two directly successive images 104 and 105 (from FIG. 1) are supplied separately to threshold value discriminators 201, whose threshold is adjusted such that the hot power unit emissions 103 of the helicopter are above it and are therefore recognized. Now, region extractors 202 extract from the entire images 104 and 105 small image regions 203 and 204 which are each centered around the image positions supplied by the threshold value discriminator.

In order to compute the differential image, the position of one image region 203 generated by the region extractor must be corrected by the position corrector 205 relative to the position of the second image region 204. The difference forming device 207 computes the picture-element-type difference 208 between the actual image region 204 and the position-corrected image region 206 of the first image 104.

By means of a bipolar threshold value discriminator 209, a bipolar trinary image 210 is produced from the differential image 208. This trinary image 210 is then examined by a segment validity evaluator 211 to identify image segments which correspond to blades of the main rotor 102 of a helicopter. Those segments 212 which satisfy the selection criteria are then described by a straight-line generator 213 which represents them as adapted straight lines. The output information of the straight-line generator 214 is supplied to a point-of-intersection calculator 215, which computes the position of all paired points of intersection between the straight lies thus generated. This position information in turn is stored, and transmitted to a decision element 217. A decision 218 is made as to whether a helicopter or a false target is present, as a function of whether a clear bunching of points of intersection develops.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting helicopters from a flying platform by means of an imaging sensor, said method comprising:
   said imaging sensor acquiring successive images of a search area;
   subtracting relevant image regions of said successive images from one another on a picture element basis to form a differential image;
   within the differential image, identifying segments which satisfy a threshold value process;
   adapting straight lines with orientation coincident to the identified segments; and
   determining intersection points of the straight lines of all segments.

2. The method according to claim 1, wherein visual fields of said successive images overlap by at least half of a visual field.

3. The method according to claim 1, wherein a threshold value process for determining position of bright image regions is used to identify segments within each image.

4. The method according to claim 1, wherein a position of bright image regions of two directly successive images are locally assigned to one another.

5. The method according to claim 1, wherein locally mutually assigned image regions are subtracted from one another with respect to corresponding picture elements.

6. The method according to claim 5, further comprising correcting a position of one of said successive images to place it in registry with the other before the implementation of the picture-element-type subtraction.

7. The method according to claim 5, further comprising:
   trinarizing said different image using an image-dependent adaptive threshold value; and
   describing resulting bipolar segments by adapted straight lines.

8. The method according to claim 5, further comprising:
   computing paired points of intersection of all straight lines; and
   evaluating said points of intersection to identify local bunching.

9. A system for detecting a helicopter, comprising:
   an image sensor;
   a data processor having a memory encoded with a program for causing said data processor to perform the following steps,
   causing said imaging sensor to acquire successive images of a search area;
   subtracting relevant image regions of said successive images from one another on a picture element basis to form a differential image;
   within the differential image, identifying segments which satisfy a threshold value process;
   adapting straight lines with orientation coincident to the identified segments; and
   determining intersection points of the straight lines of all segments.

10. For use in a system for detecting a helicopter by means of an imaging sensor, a computer readable medium encoded with a program for causing a computer to perform the following steps:
    causing said imaging sensor to acquire successive images of a search area;
    subtracting relevant image regions of said successive images from one another on a picture element basis to form a differential image;

within the differential image, identifying segments which satisfy a threshold value process;

adapting straight lines with orientation coincident to the identified segments; and determining intersection points of the straight lines of all segments.

11. A method for detecting a helicopter from a moving platform, comprising:

using an imaging sensor to acquire successive images of a search area;

comparing relevant image regions of said successive images on a picture element basis to form a differential image;

identifying image areas within said differential image, which image areas satisfy predetermined criteria indicative of a helicopter blade;

for each image area which is identified, assigning a straight line that has a spatial orientation coincident with an orientation of said image area;

determining intersection points of said straight lines; and determining a location of said helicopter based on said intersection points.

12. The method according to claim 11, wherein said predetermined criteria include a threshold difference value, minimum and maximum surface areas and minimum eccentricity.

* * * * *